United States Patent
Wong

[11] Patent Number: 5,984,480
[45] Date of Patent: Nov. 16, 1999

[54] POWER-PROPELLED KALEIDOSCOPE

[75] Inventor: Jacob Y Wong, Goleta, Calif.

[73] Assignee: Jaesent Inc., Goleta, Calif.

[21] Appl. No.: 09/007,587

[22] Filed: Jan. 15, 1998

Related U.S. Application Data

[63] Continuation-in-part of application No. 08/971,092, Nov. 14, 1997.

[51] Int. Cl.[6] .............................. G02B 27/08; A63H 30/00
[52] U.S. Cl. ............................................ 359/617; 446/175
[58] Field of Search ..................................... 359/616, 617; 446/82, 83, 175; 362/806, 807, 808, 809, 810, 811

[56] References Cited

U.S. PATENT DOCUMENTS

| | | | |
|---|---|---|---|
| 4,085,533 | 4/1978 | Ewald | 40/406 |
| 4,740,046 | 4/1988 | MacCarthy | 350/4.2 |
| 4,776,653 | 10/1988 | Kaplan | 350/4.1 |
| 5,029,954 | 7/1991 | Eilrich et al. | 350/4.2 |
| 5,054,865 | 10/1991 | Huang | 359/617 |
| 5,131,734 | 7/1992 | Hausner | 359/617 |
| 5,396,723 | 3/1995 | Liu | 40/406 |

*Primary Examiner*—Safet Metjahic
*Assistant Examiner*—Christopher E. Mahoney
*Attorney, Agent, or Firm*—Daniel C. McKown

[57] ABSTRACT

In a kaleidoscope having an object chamber containing a fluid and containing a number of objects, the objects are caused to move by setting in motion the fluid within the object chamber, using energy derived from a source mounted on the kaleidoscope. In a preferred embodiment, the fluid in the object chamber is set in motion by a small electrically powered pump that is powered by a battery mounted on the kaleidoscope under control of a microprocessor that relates the operation of the pump to the production of lighting effects and sound effects produced within the kaleidoscope. The apparatus results in a display of persistently moving patterns, even when the object chamber remains stationary, and requires no intervention by the user.

2 Claims, 5 Drawing Sheets

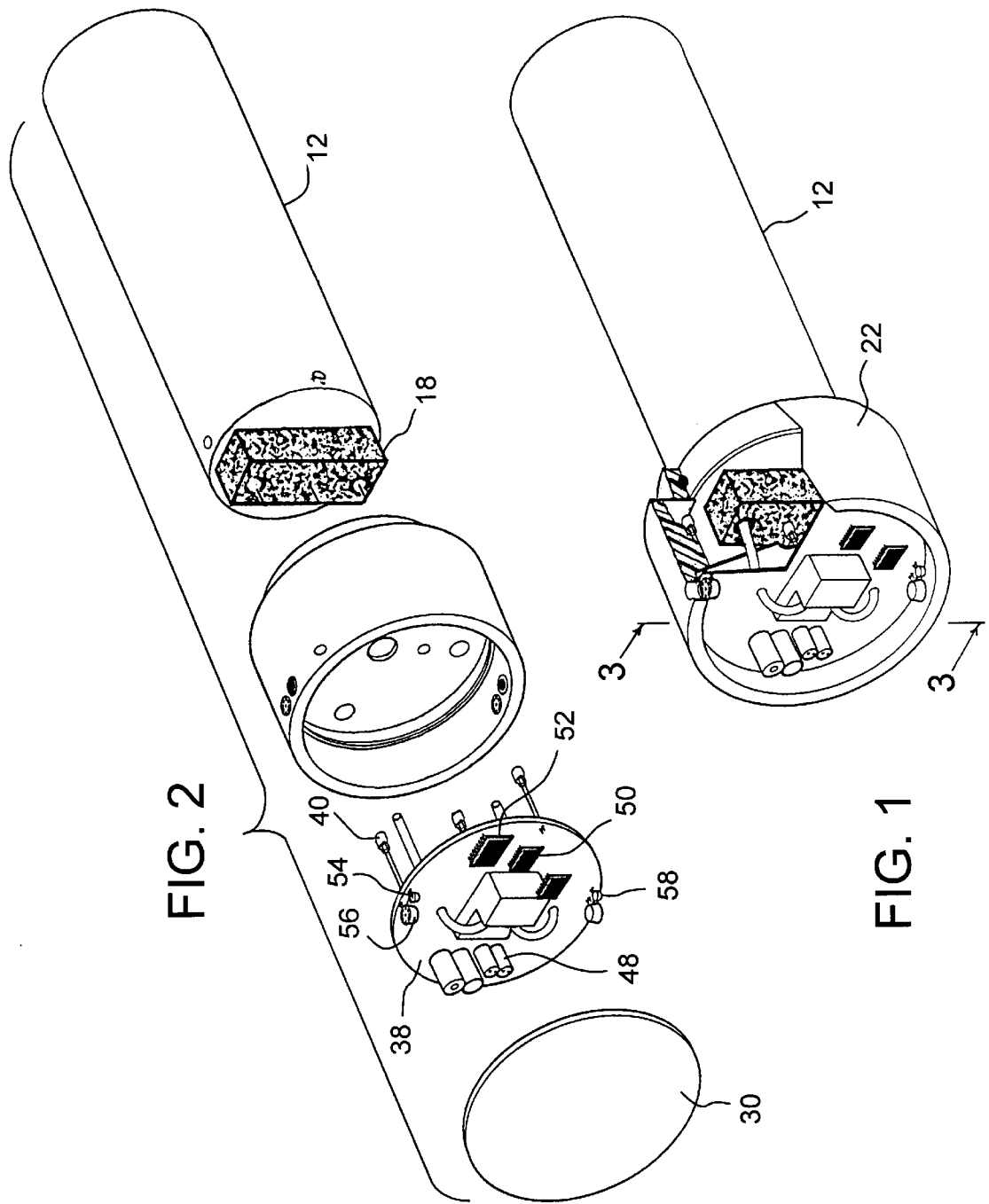

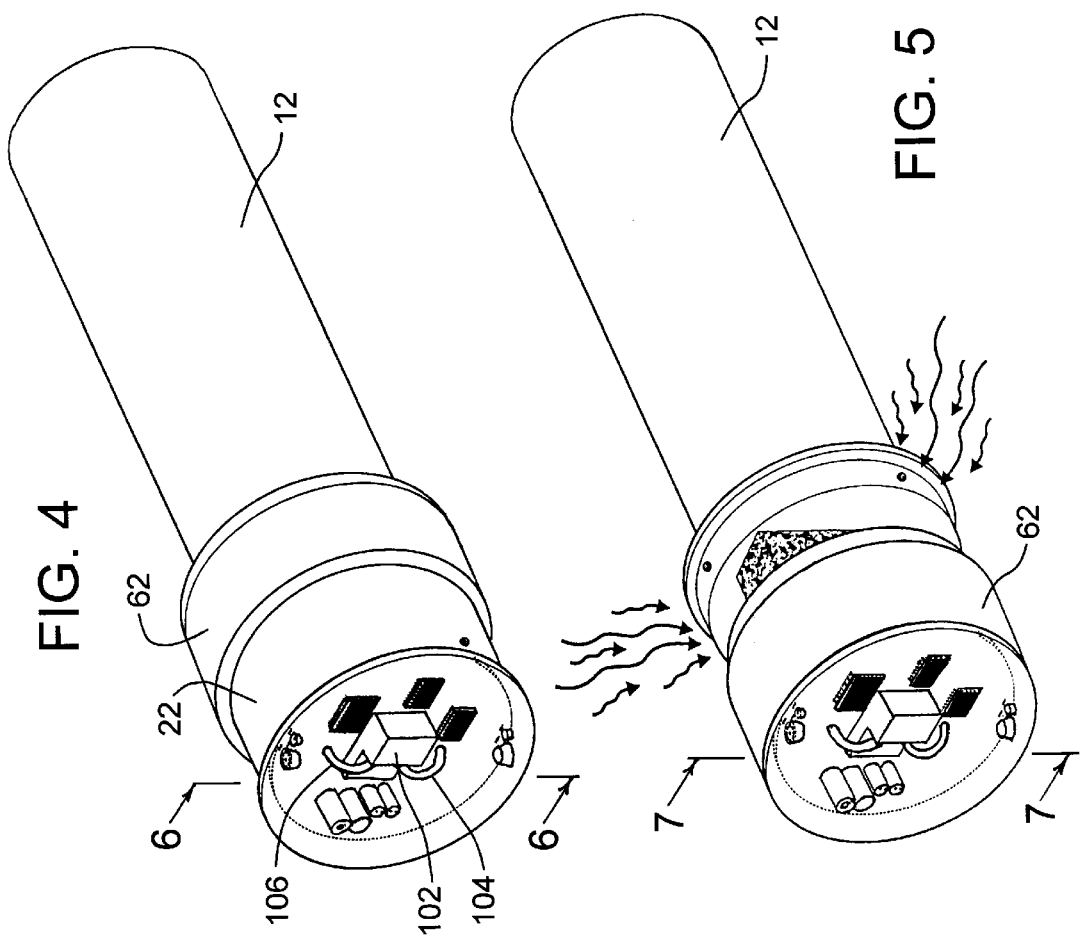

POWER-PROPELLED KALEIDOSCOPE

CROSS REFERENCE TO RELATED APPLICATIONS

The present invention is a continuation-in-part of U.S. application Ser. No. 08/971,092, filed Nov. 14, 1997, for ILLUMINATION SYSTEM FOR KALEIDOSCOPES. The disclosure of that application is incorporated herein by reference to avoid unnecessary repetition of background material.

STATEMENT RE FEDERALLY SPONSORED RESEARCH OR DEVELOPMENT

Not applicable.

REFERENCE TO A "MICROFICHE APPENDIX"

Not applicable.

BACKGROUND OF THE INVENTION

1. Field of the Invention

This invention relates to the field of optical toys and amusement devices. More specifically, this invention relates to a kaleidoscope wherein the contents of the object cell, viz. a clear transparent viscous liquid and a plurality of colored discrete particles commonly referred to as "objects", are caused to move by the action of a small pump that circulates the liquid through the object cell in controlled directions. Eye-pleasing symmetrical patterns, as observed through the eye-piece of the kaleidoscope, can be attained as the liquid and objects move without the viewer having to rotate or re-orient the object cell with respect to the prism mirror system of the kaleidoscope.

2. The Prior Art

The kaleidoscope is an optical instrument invented and patented by Sir David Brewster circa 1816. In its simplest forms, it comprises two basic systems of mirrors, namely the 2-mirror system, which produces one central image and the 3-mirror system, which produces images reflected throughout the entire field of view. The mirrors in both systems are set up in a triangular configuration in a tube similar to a hollow prism.

In the following discussion, the end of the kaleidoscope housing the eye-piece and therefore nearer the viewer will be referred to as the proximal end. The opposite end, farther away from the viewer, will be referred to as the distal end.

Located at the distal end is an object chamber or cell in the form of a short hollow cylinder containing a plurality of small contrasting colored discrete particles in a clear transparent viscous liquid. These discrete particles are imaged by the prism mirror system onto the field of view of the kaleidoscope. The totality of a kaleidoscope comprises the object chamber, the mirror system and the eye-piece, all housed inside a cylindrical tube, which is usually decorated externally to enhance the appearance of the instrument. It is the design of the object chamber, however, that governs the lighting of the colored objects inside, whose eye-pleasing symmetrical pattern images are seen by the viewer through the eye-piece of the kaleidoscope.

For most hand-held kaleidoscopes, the object chamber has two transparent ends. Light enters the object chamber through its exposed end. Alternatively, the exposed end of the object chamber is blackened to be opaque to light, and the cylindrical side wall of the chamber is made transparent to allow external light to enter the object chamber only from the side. Yet another configuration for this type of hand-held kaleidoscope calls for all surfaces of the object chamber to be transparent so that light can enter the object chamber not only through the exposed end, but also from the cylindrical side wall of the disc as well.

For a long time after the invention of the kaleidoscope, the illumination of the images created by the colored objects inside the object chamber was mostly derived from natural lighting, either directly through the distal face or the periphery of the object chamber, or both. The advent of a new time and intensity variant artificial illumination system, complete with full audio sound effects, is the subject of U.S. application Ser. No. 08/971,092 filed on Nov. 14, 1997 for ILLUMINATION SYSTEM FOR KALEIDOSCOPES, of which the present application is a continuation-in-part. Most of the kaleidoscopes known in the art for many years have fixed object chambers on the interior, which, upon rotation of the entire kaleidoscope tube, change the random distribution of objects inside the object chamber thereby presenting a variety of pleasing and symmetrical images to the viewer. One such kaleidoscope was disclosed in U.S. Pat. No. 1,294,967 issued Feb. 18, 1919 to Anton Stabla. This patent shows an exceedingly simple and elegant construction of the kaleidoscope using an inexpensive tube made from a single piece of material. The object chamber is formed by a pair of transparent plates, separated by a spacer, with a plurality of colored objects disposed between them. Natural lighting is used to illuminate the object chamber through the transparent plate that closes the end of the tube. Although the object chamber is fixed, upon rotating the entire kaleidoscope tube, the colored objects inside the object chamber tumble and thereby create different images for the viewer of the kaleidoscope.

In U.S. Pat. No. 3,020,796 issued Feb. 13, 1962, Kaplan advanced the idea of incorporating a single electric lamp under the translucent object chamber of a stationary or table kaleidoscope as a means of illumination in lieu of natural light. A disk, which bears a variety of colorful patterns and figures, is interposed between the object chamber and the electric lamp and is rotated to produce the desirable visual effects to be viewed. Although this idea of an effectively rotating object chamber for a table kaleidoscope by Kaplan is not applicable to hand-held kaleidoscopes, it did nevertheless represent the first rotating object chamber on record.

In U.S. Pat. No. 3,990,772 issued Nov. 9, 1976, Knott was the first to introduce an effective rotating object chamber for a hand-held kaleidoscope in the form of a rotating carriage retained at the distal end of the kaleidoscope tube and carrying with it a color disc and an opaque object box. As the carriage is made to rotate about the axis of the kaleidoscope tube, the colorful objects inside the object box are caused to tumble, thereby producing a progression of continuously changing colorful patterns for the viewer.

In U.S. Pat. No. 5,131,734 issued Jul. 21, 1992, Hausner describes an improved objective illumination assembly for the hand-held kaleidoscope. Hausner includes an electric light source within the kaleidoscope tube body between the viewing end (eye-piece) and the object chamber. Furthermore, to rotate the object chamber, he devised a special mechanical assembly including a small electric motor, a drive shaft and a rubber band harness. Hausner's invention represents the first power-assisted hand-held kaleidoscope on record not only to provide an artificial illumination system for the object chamber in lieu of natural lighting, but also a motorized mechanical assembly for producing an ever-changing display of symmetrical images for the viewer. Unfortunately, the device was relatively fragile and yet very complicated to build. Furthermore, it was very costly to build. This assessment of Hausner's invention is borne out by the fact that to date it remains only as a curiosity piece and has never been widely adopted and copied in the industry.

In U.S. Pat. No. 4,740,046 issued Apr. 26, 1988, Mac-Carthy introduced a so-called "liquid" kaleidoscope wherein the object chamber consists of one or more tubular sections in which a liquid and colored solids flow in spatially confined volumes and in controlled directions. The object chamber which contains the assembly of closed tubes can be rotated in a clockwise or a counterclockwise direction. The resultant motion of the liquid and the solid particles in this particular configuration of the object cell generates an endless display of pleasing static and dynamic symmetrical images as seen by the viewer.

In 1993, Eilrich and Baker in U.S. Pat. No. B1-5,029,954 (originally issued Jul. 9, 1991 as U.S. Pat. No. 5,029,954 and reexamined in 1993) advanced the idea of a kaleidoscope having a removable object tube in lieu of a stationary object chamber. The length of this object tube, whose mid section acts as the object chamber for the hand-held kaleidoscope, can be many times the diameter of the kaleidoscope tube itself The extent of the object tube's diameter, on the other hand, is not critical as long as it is larger than the aperture of the prism mirror system of the kaleidoscope. The object tube is filled with a clear transparent fluid having a plurality of discrete contrasting colored elements whose movements are subjected to the force of gravity. When the object tube is swung to a vertical direction, all the discrete contrasting colored elements tend to drift downwards in the fluid towards its bottom. As these particles drift down through the aperture of the prism mirror system of the kaleidoscope, the effect created is equivalent to that of an object cell with its contents changing as a function of time. In this manner the viewer is presented with a variety of changing colorful symmetrical images as if the object cell of the kaleidoscope is being rotated.

However, after a certain period of time has elapsed, typically one to two minutes, all the particles have drifted downwards to the bottom of the object tube. At this point the object tube will cease to function as the object cell for the kaleidoscope because there are no more particles in the field of view of the prism mirror system. The viewer would have to turn the object tube with the kaleidoscope from end to end in order that the particles inside the tube can once again drift downwards towards its bottom. In this way the "rotating object cell" effects of the object tube will once again be re-created.

It is clear from the discussion of the prior art presented above that several attempts had been made to simulate the visual effects of a rotating object cell for a hand-held kaleidoscope with the use of a single removable object tube (U.S. Pat. No. B1-5,029,954 to Eilrich and Baker) or an assembly of fixed ones filled inside with a clear transparent viscous fluid and a plurality of colorful particles (U.S. Pat. No. 4,740,046 to MacCarthy). In both cases the force of gravity is relied upon to act on the particles inside the tube thereby requiring the viewer to physically move or re-orient the kaleidoscope from time to time. Furthermore, in the case of Eilrich and Baker's invention, the very long object tube is very cumbersome since it extends symmetrically and perpendicularly to the kaleidoscope tube at the distal end of the instrument. Thus there exists a need for a kaleidoscope that has a power-propelled mechanism that would eliminate any need at all to rotate or re-orient its object chamber in order to present the viewer an ever-changing display of pleasing and colorful symmetrical images. The present invention with its novel pumping mechanism serves to fill this need.

BRIEF SUMMARY OF THE INVENTION

It is an object of the present invention to provide apparatus for maintaining the objects in the object chamber in a continuing state of motion, even when the object chamber remains stationary, and with no action required of the viewer. This simulates the visual effects of persistently-moving patterns that until now could be obtained only by manually rotating the object chamber. In accordance with the present invention, the fluid in the object chamber is forced to move, dragging with it the suspended objects.

In a preferred embodiment of the present invention, a small electrically-driven pump is used to circulate a fluid (liquid or air) in controlled directions inside a specially designed object chamber having an inlet and an outlet. The motion of the objects (solid particles) is limited to the inside of the object chamber by the use of a plurality of special filters at the inlet and outlet which prevent the objects from leaving the object chamber. The pumping direction of the fluid through the object chamber automatically reverses itself after a short time interval, typically one to two minutes, in order to prevent the objects from accumulating at the filters.

In another embodiment, the action of the pump is synchronized with the time duration, intensity level and sound volume variant illumination system of the kaleidoscope as disclosed in an earlier U.S. application Ser. No. 08/971,092 filed Nov. 14, 1997 for ILLUMINATION SYSTEM FOR KALEIDOSCOPES.

In another embodiment of the present invention, the fluid in the object chamber is a clear viscous liquid.

In another embodiment of the present invention, the fluid in the object chamber is air.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE SEVERAL VIEWS OF THE DRAWING

FIG. 1 is a perspective view showing a first preferred embodiment of the present invention with the front cover removed;

FIG. 2 is an exploded perspective view of the embodiment of FIG. 1;

FIG. 4 is a perspective view of a second preferred embodiment of the present invention with the front cover removed and in a configuration that makes use of artificial illumination;

FIG. 5 is a perspective view, similar to that of FIG. 4, but with the system in a second configuration that disables the artificial illumination and admits ambient light;

DETAILED DESCRIPTION OF THE INVENTION

Figure 3:
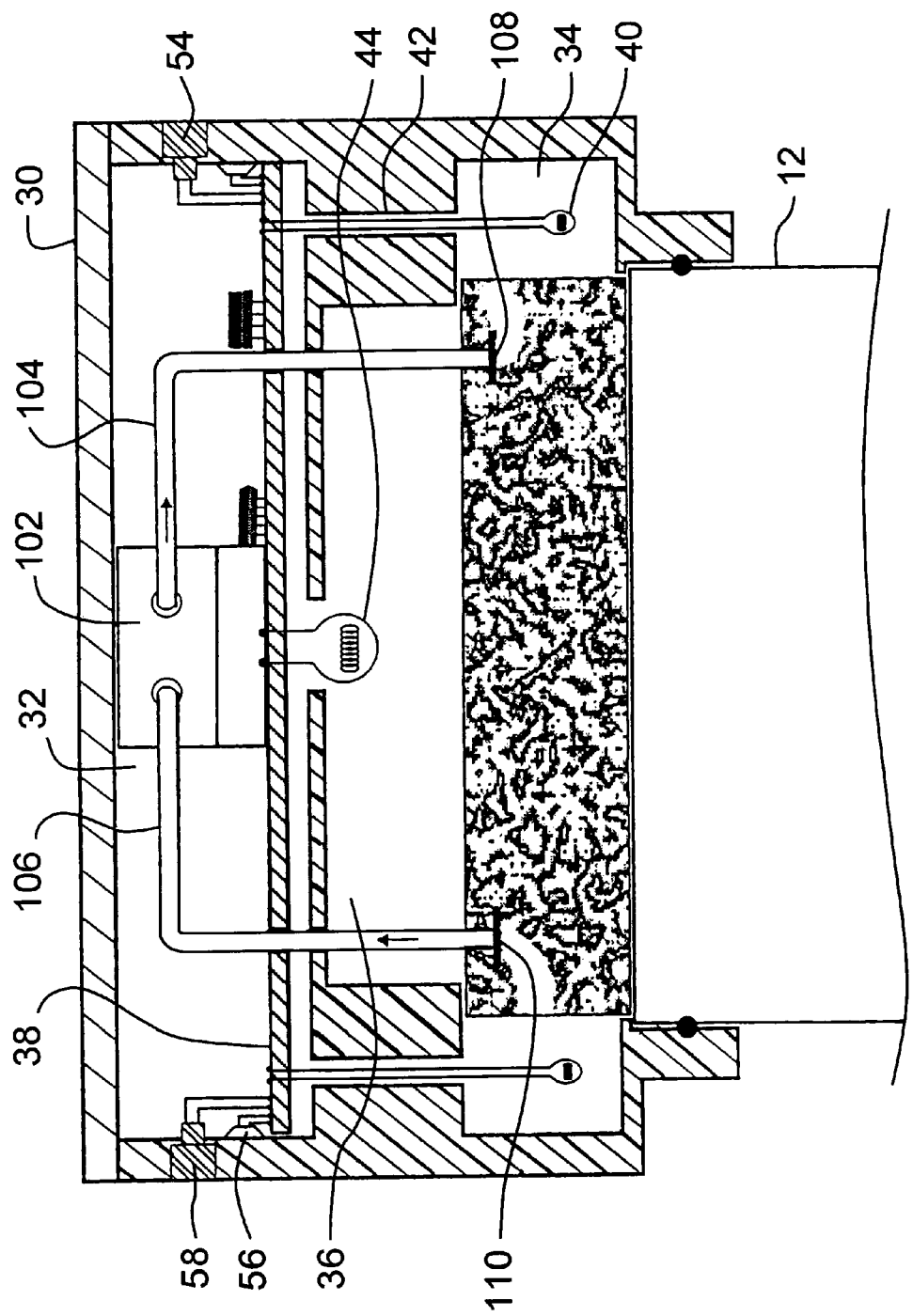
FIG. 3 is a diagrammatic view in the direction 3—3 indicated in FIG. 1.

Because the present application is a continuation-in-part of U.S. Pat. application Ser. No. 08/971,092, filed on Nov. 14, 1997 for ILLUMINATION SYSTEM FOR KALEIDOSCOPE, it was deemed desirable to use the same reference numerals to denote the various parts as were used in the parent application to denote the same or substantially similar elements. New elements will be denoted by reference numerals greater than 100.

FIGS. 1–3 relate to a first preferred embodiment in which the illumination system produces the light by which the objects within the object chamber are viewed.

FIGS. 4–7 relate to a second preferred embodiment in which, at the user's choice, the objects may be viewed by the artificial light of the internal illumination system of the kaleidoscope or by ambient light, such as daylight or light produced by an external artificial light source.

Referring to the embodiment of FIGS. 1, 2 and 3, the kaleidoscope includes a body 12 that has at its proximal end an eyepiece and that encloses a number of plane mirrors that are arranged to form a hollow prism, as is customary in the art. A housing 22 receives the body 12 of the kaleidoscope and is rotatable with respect to it. The object chamber 18 is provided with transparent walls, and in one preferred embodiment is filled with a viscous liquid such as glycerin or a light oil in which the objects to be viewed are immersed. All kinds of objects may be included in the object chamber, and in accordance with the present invention, some of the objects exhibit fluorescence after being illuminated by light of appropriate wave length.

The housing 22, along with the cover 30 define three internal chambers: a disc-shaped front chamber 32, an annular rear chamber 34, and a disc-shaped center chamber 36. A printed circuit board 38 and electronic components are included in the disc-shaped front chamber 32. Four xenon flash lamps, of which the lamp 40 is typical, are included in the annular rear chamber 34. Passages, of which the passage 42 is typical, permit conductors to extend from the printed circuit board 38 to the flash lamps 40. A centrally-located xenon flash lamp 44 is included in the disc-shaped center chamber 36.

The walls of the annular rear chamber 34 and of the disc-shaped center chamber 36 are made highly reflective by application of a coating of highly-reflective material.

Replaceable batteries, of which the battery 46 is typical, are the primary source of electrical power used to operate the illumination system. Circuitry is provided on the printed circuit board 38 that converts the output of the batteries 46 to a higher voltage that is used for charging the electrolytic capacitors, of which the capacitor 48 is typical, and the capacitors are discharged into the xenon flash lamps 40 and 44 by the lamp driver chip 50 under control of the microprocessor 52. Operation of the push button switch 54 by the user initiates the program of lighting effects. Sound effects are also produced in the preferred embodiment by a miniature loudspeaker 56, and the sound effects can be muted by pressing a push bottom mute switch 58.

In essence, the microprocessor 52 serves as a timer that starts to run when the push button switch 54 is depressed, and various gates are enabled when the timer reaches pre-established times. The enabling of the various gates results in current being applied to one or more of the flash lamps and in audio signals being applied to the loudspeaker to produce the desired effects at the pre-established times. When a pre-established maximum time has elapsed, the program repeats itself when the push button switch 54 is again pushed. Otherwise the operation of the illumination system is terminated.

In accordance with the present invention, a small pump 102 is mounted on the printed circuit board 38. It is used to set in motion the fluid within the object chamber 18. The pump 102 is connected to the object chamber 18 by the conduits 104 and 106. At any particular instant, one of the conduits 104, 106 is drawing fluid from the object chamber 18 while the other of the conduits 104, 106 is carrying fluid to the object chamber. To prevent the objects 20 within the object chamber 18 from being drawn into the pump 102, or into the conduits 104, 106, the ends of the conduits that extend into the object chamber 18 are provided with the filters 108 and 110 respectively. In this way, the objects within the object chamber are dragged along with the moving fluid and thus set into motion, while at the same time, only the fluid moves through the conduits 104 and 106 and the pump 102.

In accordance with the present invention, the pump 102 is powered by the batteries 46, and the application of electrical power to the pump 102 is controlled by the microprocessor 52. In the preferred embodiment, the microprocessor 52 reverses the polarity of the electrical power supplied to the pump, thereby causing the pump to reverse its direction, which causes the fluid circulating through the conduits 104 and 106 also to reverse direction. This reversal of direction has proven helpful in preventing the filters 108, 110 from becoming clogged.

In the preferred embodiment, the pump 102 is electrically driven, but in alternative embodiments, the pump may be driven by a manually-operated rubber squeeze bulb that may contain a gas or a liquid. In still other embodiments, the flow of fluid through the conduits 104 and 106 may be driven by gravity, for example, by a weighted piston descending in a vertical or inclined cylinder. In other embodiments, the pump is powered by solar-electric cells, and in other embodiments, solar-electric cells are used to recharge the battery 46.

In the preferred embodiment, the microprocessor 52 controls the operation of the pump 102 in relation to the lighting effects and sound effects that also are programmed by the microprocessor 52.

In accordance with the preferred embodiment, the microprocessor-controlled pump 102 causes the objects in the object chamber 18 to move in relation to the programmed light and sound effects, even when the object chamber remains stationary, and thus no intervention by the user is required.

In the preferred embodiment, the program of operation of the pump as well as of the lighting and sound effects is stored in a ROM, and different programs can be provided by replacing the ROM by another ROM containing a different program.

FIGS. 4, 5, 6 and 7 show a second preferred embodiment of the present invention in which the action of the pump 102 remains the same, but in which the kaleidoscope may be altered by the user from a first configuration in which the illumination is provided by the lights within the kaleidoscope to a second configuration in which the internal illumination system is disabled, and the light is supplied by an external source which might include ambient daylight or external artificial light sources.

Figure 6:
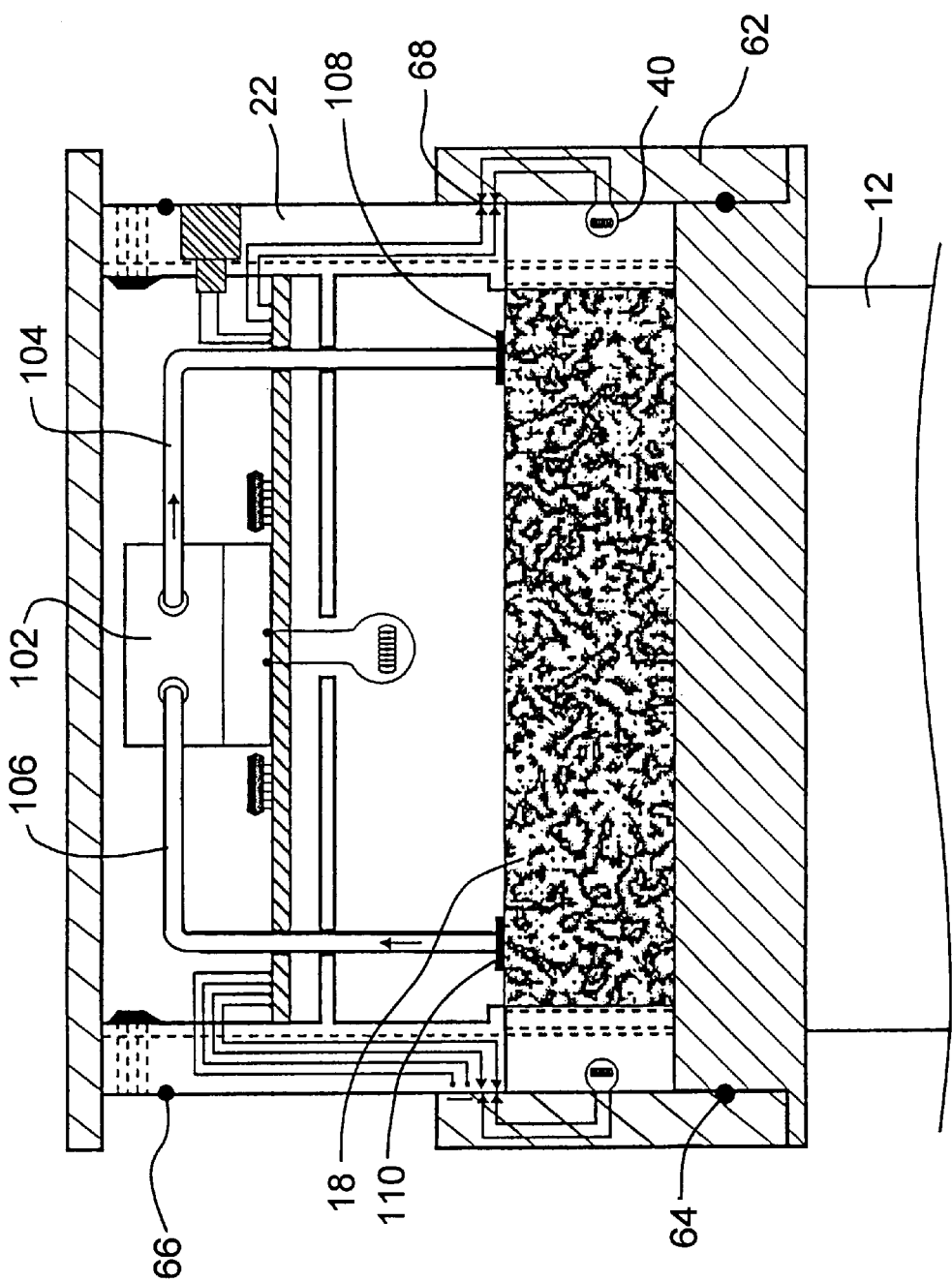
FIG. 6 is a diagrammatic view in the direction 6—6 indicated in FIG. 4.
Figure 7:
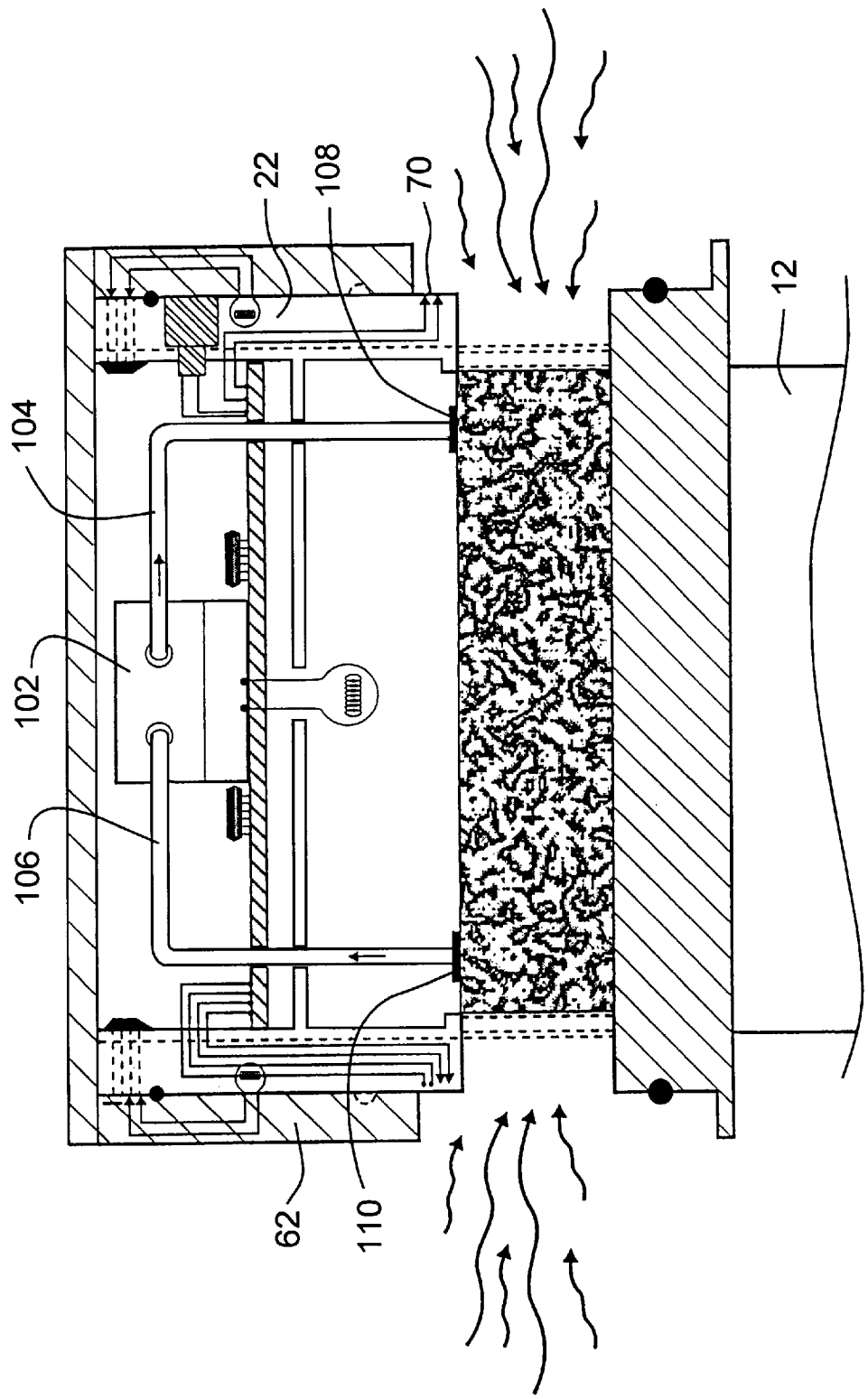
FIG. 7 is a diagrammatic view in the direction 7—7 indicated in FIG. 5.

As best seen by comparing FIG. 4 with FIG. 5 and by comparing FIG. 6 with FIG. 7, the illumination system of the second preferred embodiment includes a collar 62 that is slidable in the axial direction between the position shown in FIG. 6 and the position shown in FIG. 7. When the collar 62 is in the distal position shown in FIGS. 5 and 7, the illumination system is disabled and the user may view the objects in the object chamber 18 with the aid of whatever ambient light enters the object chamber 18 from the side. A first set of detents, of which the detent 64 is typical, hold the collar 62 in the proximal position, and a second set of detents, of which the detent 66 is typical hold the slidable collar 62 in its distal position.

Enabling and disabling of the illumination system and of the pump 102 is accomplished through the use of sliding electrical contacts 68 located on the collar 62 and the contacts 70 located on the housing 22. When the collar 62 is in the proximal position of FIGS. 4 and 6, the contacts 68 are in registration and in contact with the contacts 70, thereby enabling operation of the lamps 40.

The operation of the circuit board and the components mounted on it are substantially the same in the second preferred embodiment of FIGS. 4–7 as they are in the embodiment of FIGS. 1–3.

Thus, there has been described an apparatus for use with a kaleidoscope having an object chamber containing a fluid and containing objects immersed in the fluid, for producing a display of persistently moving patterns, even when the object chamber remains stationary. In accordance with the present invention, the objects within the object chamber are caused to move by setting in motion the fluid within the object chamber. In a preferred embodiment, the fluid is set in motion by means of a small electrically-powered pump, and the pump is powered by an energy source, such as batteries, mounted on the kaleidoscope. Application of electrical power to the pump is controlled by the same microprocessor that programs the operation of the lighting effects and sound effects, and the pump is operated in relation to the lighting effects and sound effects.

The foregoing detailed description is illustrative of several embodiments of the invention, and it is to be understood that additional embodiments thereof will be obvious to those skilled in the art. The embodiments described herein together with those additional embodiments are considered to be within the scope of the invention.

What is claimed is:

1. A kaleidoscope having an object chamber containing a fluid and containing objects immersed in the fluid, comprising:

a pump for setting in motion the fluid within the object chamber so as to produce a display of persistently moving patterns even when the object chamber remains stationary;

a lamp positioned to illuminate the object chamber;

electronic means mounted on the kaleidoscope and electrically connected to said lamp for controlling the operation of said lamp in accordance with a repeatable preestablished program, and electrically connected to said pump for controlling the operation of said pump in relation to the repeatable pre-established program; and, a self-contained source of electrical power mounted on the kaleidoscope and electrically connected to said pump for supplying electrical power to said pump under control of said electronic means and for supplying electrical power to said lamp under control of said electronic means.

2. The kaleidoscope of claim 1 wherein said electronic means reverses the direction of flow of the fluid.

* * * * *